United States Patent

Gregoire et al.

Patent Number: 5,816,114
Date of Patent: Oct. 6, 1998

[54] HIGH SPEED FLYWHEEL

[75] Inventors: Daniel J. Gregoire; Robin J. Harvey, both of Thousand Oaks, Calif.

[73] Assignee: Hughes Electronics Corporation, El Segundo, Calif.

[21] Appl. No.: 878,501

[22] Filed: Jun. 18, 1997

Related U.S. Application Data

[62] Division of Ser. No. 568,212, Dec. 6, 1995.

[51] Int. Cl.[6] .................................................. G05G 1/00
[52] U.S. Cl. .............................. 74/572; 74/573 R; 464/87
[58] Field of Search ...................... 74/572–574; 310/74, 310/153; 464/87

[56] References Cited

U.S. PATENT DOCUMENTS

| | | |
|---|---|---|
| 3,978,256 | 8/1976 | James . |
| 4,030,754 | 6/1977 | Merlette . |
| 4,036,080 | 7/1977 | Friedericy et al. . |
| 4,080,845 | 3/1978 | Hatch . |
| 4,179,951 | 12/1979 | Theyse et al. . |
| 4,285,251 | 8/1981 | Swartout . |
| 4,461,515 | 7/1984 | Gwynette et al. . |
| 4,721,342 | 1/1988 | Daniels et al. . |
| 4,832,414 | 5/1989 | Jones . |
| 4,860,611 | 8/1989 | Flanagan et al. . |
| 4,991,462 | 2/1991 | Breslich, Jr. et al. . |
| 5,285,699 | 2/1994 | Walls et al. . |
| 5,628,232 | 5/1997 | Bakholdin et al. ........................ 74/572 |
| 5,696,414 | 12/1997 | Serder et al. ........................ 74/572 X |

FOREIGN PATENT DOCUMENTS

| | | |
|---|---|---|
| 25 40 625 | 3/1977 | Germany . |
| 26 06 577 | 8/1977 | Germany . |
| 58-30548 | 2/1983 | Japan ...................................... 74/572 |
| 759777 | 8/1980 | U.S.S.R. ................................. 74/572 |
| 794277 | 1/1981 | U.S.S.R. . |
| 1270449 | 11/1986 | U.S.S.R. ................................. 74/572 |

OTHER PUBLICATIONS

R. Coco, et al. "Ball Bearing Applications to a High–Speed Flywheel," Flywheel Energy Storage Technology Workshop, Draper Laboratory, Nov., 1993, pp. 1–16.

*Primary Examiner*—Vinh T. Luong
*Attorney, Agent, or Firm*—V. D. Diraiswamy; W. K. Denson-Low

[57] ABSTRACT

A method of operating a flywheel (10) includes the provision of a central shaft (12) defining an axis of rotation; providing a disk-shaped hub (22) joining drivingly with both the shaft and with a rim portion (34); and which hub portion has a shape when the flywheel is at rest which is of a shallow dihedral geometry. That is, the hub is cone-shaped when the flywheel is at rest. As the rotational speed of the flywheel is increased from the at-rest speed toward and then to a design operating speed for the flywheel, this hub progressively flattens out until it becomes flat and extends radially between the shaft and the hub at the design speed for the flywheel. Thus, the flattening of the hub with increasing rotational speed for the flywheel moves the rim portion axially in response to centrifugal force.

5 Claims, 1 Drawing Sheet

HIGH SPEED FLYWHEEL

This is a division of pending application Ser. No. 08/568,212 filed Dec. 6, 1995.

BACKGROUND OF THE INVENTION

1. Field of the Invention

The present invention is in the field of energy storage flywheels. More particularly, the present invention relates to flywheels for high-speed operation having a central shaft carrying a hub. The hub carries a comparatively more massive rim, and the shaft, hub, and rim are optimized for stress distribution characteristics.

2. Related Technology

Recently, a great deal of emphasis has been placed on the development of flywheel energy storage systems (FWES). In particular, recent attention has been directed to the use of flywheels as devices for energy storage in mass transportation vehicles operating under stop-and-go conditions. For example, the flywheel may be charged with energy by bringing its rotational speed to a high level while the vehicle is stopped. Energy is then drawn from the flywheel to accelerate the vehicle and power it toward its next stop. For braking of the vehicle, rather than dissipating the kinetic energy of the vehicle as heat from conventional brakes, energy could be drawn from the moving vehicle both to slow its speed and for return to the flywheel for later use. Accordingly, the flywheel provides a conceptually simple, potentially effective and highly efficient means of storing energy for vehicular and other applications.

In any flywheel-based energy storage system, energy is stored by causing the flywheel to rotate at a high speed about a central axis defined by a shaft. More particularly, the kinetic energy contained by a rotating flywheel, W, is $\frac{1}{2} I\omega^2$ where I is the moment of inertia of the mass of the flywheel about the center of rotation and $\omega$ is the angular velocity in radians per second. When the moment of inertia is large, large amounts of energy will be absorbed or released for relatively small changes in the angular velocity of the flywheel. For this reason, non-mobile flywheels (such as those used on large stationary engines) historically were large massive devices. However, small, light, high-speed, and high-energy flywheel systems are necessary for mobile applications. Dividing the energy content of the flywheel rotor by the weight provides the energy density of the system. In general, the higher the energy density of a flywheel rotor the more desirable the system is for mobile applications, such as aboard a vehicle.

A variety of flywheel systems have been tested on a laboratory scale in the past few years. Flywheels which can operate at a high angular velocity and which are fabricated of advanced materials have recently begun to move beyond the prototype stages and into production. Among the materials of construction for the flywheel which have shown promise in such applications due to their high strength and low weight are composite materials. Composites are materials in which two or more distinct substances such as glasses, ceramics, or polymers are combined to produce a material with structural or functional characteristics different from the individual constituents. The constituents retain their individual characteristics and are distinguishable on a microscopic scale following formation of the composite. Typically one constituent is classified as the reinforcement and the other as the matrix.

Despite improvements in materials, attempts to construct and utilize flywheels which are able to withstand the stresses inherent in light weight energy storage systems have proven difficult. For example, flywheel rims formed of multilayer concentric annular shells made from unidirectional filamentary material in a matrix are well adapted to withstand the stresses imposed by centrifugal force at high rotational speeds. Such flywheel rotors conventionally have a hub including spokes coupling the rim to the shaft. The centrifugal force imposed on all elements of a flywheel varies with the radius from the axis of rotation. Generally, the rim is the more highly stressed component; however, the spokes of a flywheel are also subjected to strong centrifugal forces.

Unfortunately, at the ultra high rotational speeds used in FWES, the rim and spokes of these flywheels tend to stretch and distort to expand radially. Even the unidirectional reinforcement materials embedded in the composite matrix are elastic and deform when exposed to the intense centrifugal forces created by the high-speed operation of the flywheel. Moreover, such constructs present the difficult problem of how to unite the matrix material spokes to form the hub of the flywheel and how to join the spokes to the rim to prevent failure during repeated deformation and exposure to high stress during operation.

Another attempted solution to the problems imposed by the use of flywheel rotors in FWES systems involves the use of multi-ring, prestressed, thin cylindrical composite structures to form the flywheel. Such configurations attempt to reduce the radial component of the internal stress at the expense of the tangential component or "hoop stress." This technique is partially effective at reducing the internal stress so that somewhat higher rotational velocities can be achieved using multi-ring designs. However, the fabrication of such flywheels has proven to be extremely labor intensive and expensive, thereby increasing the unit cost of such flywheels. Furthermore, there remains some considerable question as to the ability of the pre-stress arrangement to survive the long term effects of fatigue and material creep when the rotor is cycled numerous ($>10^6$) times between high and low speeds. That is, the effects of creep with the passage of time and with the repeated application of stresses with acceleration and deceleration of the flywheel results in the loss of the necessary pre-stress level. With loss of pre-stress, the material stress distribution in the flywheel will change toward a more failure prone distribution. As such, flywheel rotors formed using this prestressed multi-ring structure are often subject to catastrophic failure upon continuous long term use.

Yet another conventional high-speed flywheel is believed to be disclosed in a paper believed to be authored by Richard Coco, presented at a workshop for "Flywheel Energy Storage Technology", provided by the U.S. Department of Energy at Oak Ridge National Laboratory, on Nov. 2–4, 1993. This conventional high-speed flywheel design is believed to involve an annular rim supported from a central shaft by means of a steeply angled conical hub. and believed to be entitled, "Flywheel Energy Storage Technology". It is believed that the steeply angled conical hub of this conventional flywheel design does not approach true radial congruence between its inner and outer peripheries at any operational speed for the flywheel.

SUMMARY OF THE INVENTION

In view of the deficiencies of the conventional related technology, it is a primary object for the present invention to overcome one or more of these deficiencies.

Another object of the present invention is to provide a flywheel with a rim and hub carried upon a shaft, which flywheel exhibits optimized stress distribution.

Yet another object is to provide a flywheel energy storage system which includes such a flywheel.

Still another object is to provide a method of making such a flywheel.

Finally, an object for the present invention is to provide a method of operating such a flywheel to control stress distribution in the flywheel.

These and other objectives are provided by the annular flywheel rotor of the present invention which, in a broad structural aspect, is formed as a disk-like hub carried on a shaft. The disk shape of the hub deviates axially from the true radial direction as this hub extends radially. In other words, when viewed in profile the hub of the flywheel is shaped like a disk with a shallow dihedral angle. More commonly, the profile of the hub portion of the flywheel rotor may be thought of as being approximated by a truncated shallow cone or inverted dish-shape concentrically arranged about the axis of rotation. At its outer diameter, the hub is joined to and carries a considerably more massive rim of generally cylindrical configuration. At its inner diameter, the hub is joined to a central shaft. The rotor of the present invention takes advantage of the elastic properties of materials and a specifically tailored dished contour of the hub to reduce the stresses experienced by the rotor under operating conditions when compared to a flywheel rotor with a rim pre-stressed on spokes, or with a rim carried by a radially extending truly-radial disk-like hub.

Particularly, the present invention provides a high-speed flywheel providing optimized stress distribution characteristics, the flywheel comprising a rotatable central shaft, a disk-like hub having a radially inner portion adjacent to and joining with the shaft and a radially outer peripheral portion offset axially with respect to the radially inner portion, a cylindrical rim carried upon said hub at said radially outer portion of the latter, and said hub including means for deflecting the radially outer portion axially toward radial congruence with the radially inner portion in response to spinning of the flywheel rotor about the concentric axis of rotation, whereby said hub carries said rim axially with increased rotational speed from standstill to a selected operational speed for said flywheel.

Advantages of the present invention compared to conventional high-speed flywheels, including prior high-speed flywheels having a steeply angled conical hub, are a higher maximum safe speed due to more favorable stress distribution in the flywheel; and a wide range of operating speeds in which the shallow conical disk shape of the hub provides both a compact structure and a structure which is stable against vibrational modes.

Other objects, features, and advantages of the present invention will be apparent to those skilled in the art from a consideration of the following detailed description of a preferred exemplary embodiment thereof taken in conjunction with the associated Figures which will first be described briefly.

DETAILED DESCRIPTION of AN EXEMPLARY PREFERRED EMBODIMENT of the INVENTION

Figure 1:
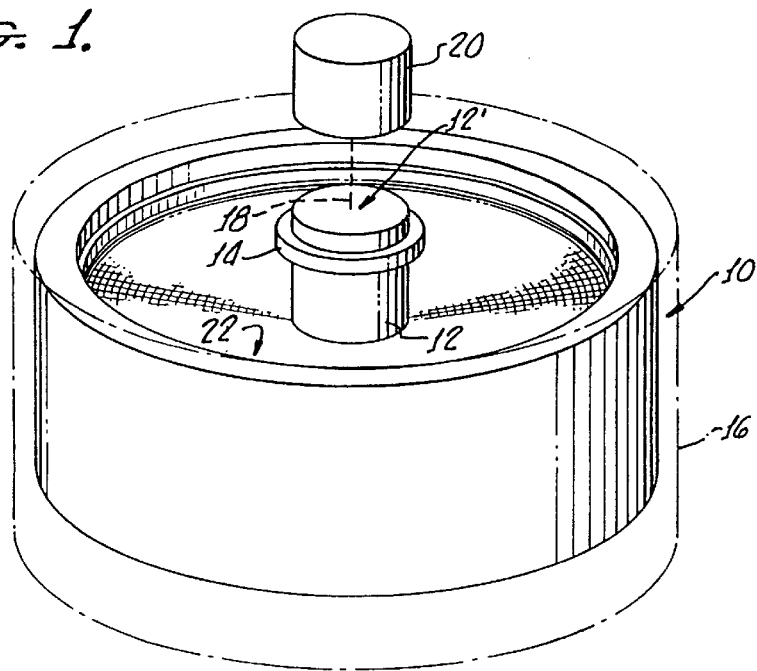
FIG. 1 is a perspective view of a flywheel rotor of the present invention.
Figure 2:
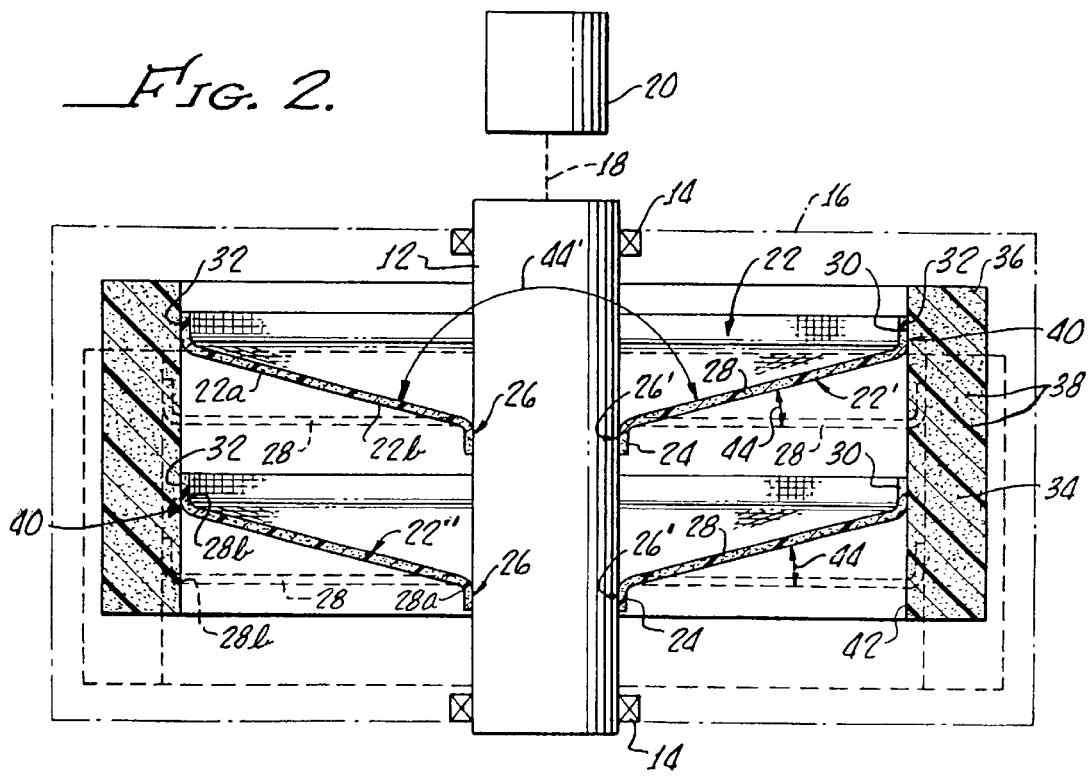
FIG. 2 provides a side elevation view, partially in cross section, of a flywheel rotor in accordance with the present invention.

Turning now to FIGS. 1 and 2 in combination, the numeral 10 generally indicates a flywheel embodying the teachings of the present invention. The flywheel 10 includes a rotational shaft 12 which is journaled by bearings schematically indicated at 14. Shaft 12 defines a rotational axis, indicated with the arrowed numeral 12', viewing FIG. 1. The shaft 12 may be formed of a variety of convenient materials including steel, titanium, aluminum and other metallic and non-metallic materials. If desired, the shaft 12 may be formed of composite material the same as or different from the other portions of the flywheel 10. Around the flywheel 10 is schematically indicated a vacuum housing 16 which allows the flywheel 10 to rotate therein at high speed without the loss of energy to windage. Housing 16 is conventional and well known to those ordinarily skilled in the pertinent arts. Therefor, housing 16 in not further disclosed herein. A rotational energy exchange connection (indicated by dashed line 18 coincident with the axis of rotation 12') is effected between the shaft 12 and a energy source and absorber 20, such as a high-speed motor/generator. As required, a rotating portion of the energy source and absorber 20 may be rotationally drivingly attached or connected to the shaft 12 according to conventional art.

Flywheel 10 includes a hub portion, generally indicated with the numeral 22 in both FIGS. 1 and 2. Viewing FIG. 2, it is seen that the hub portion 22 includes two similar hubs 22' and 22", which are spaced axially apart. The two hubs 22' and 22" are like-disposed, disk-shaped, and of shallow dihedral shape. However, a flywheel may include only a single hub portion 22' or 22", or may include more than two axially spaced hub portions like the parts 22' and 22" while still remaining within the scope of the present invention. The hub(s) 22' and 22" are preferably formed of composite material having carbon fibers (indicated on FIG. 2 with the stippling on this cross sectional view, and by the numeral 22a) extending circumferentially and radially in an epoxy matrix (indicated on FIG. 2 with the cross hatching on this cross sectional view, and by the numeral 22b).

However, hub 22' and 22" may be made of a variety of materials, including other composite materials, metals and metal alloys, high strength polymers, ceramics, and combinations thereof. The matrix may be made of epoxy, polymerizing resins, thermoset resins, and thermoplastic resins, for example. The fibrous reinforcement may be made of carbon, glass, aramid, graphite, boron, ceramic, silicon carbide, and combinations thereof. Each of the depicted axially spaced hubs 22' and 22" includes a respective inner axially-extending peripheral portion 24 which defines a bore 26.

The shaft 12 is received in the bore 26 so that the shaft 12 and hub 22 are coupled together in a mutually driving and supporting relationship. A convenient way of effecting this driving and supporting relationship of the shaft to hub portion 22 is to utilize an adhesive joint, indicated with the arrow 26'. The joint 26' my be formed by using an adhesive that is compatible with the materials composing the hubs 22' and 22", as well as shaft 12. One alternative is to user the same epoxy used in the composite material of the hubs 22' and 22'.

When the flywheel 10 is at rest, the hubs 22' and 22" include a respective portion 28 which extends radially outwardly as a radially and circumferentially continuous disk while also extending axially to a radially outer portion 30 of each hub 22' and 22". The radially outer portion 30 defines an axially extending radially outer surface 32 to which a comparatively more massive and cylindrical rim portion 34 of the flywheel is attached. The rim portion 34 is generally ring-shaped and is drivingly and supportingly joined to the two hub portions 22' and 22" at their respective outer surfaces 32. This rim portion 34 is preferably formed of composite material having plural circumferentially extending fibers 36 embedded in a matrix material 38.

By way of example only, the rim 34 may be formed of carbon fiber reinforced composite material having an epoxy matrix. Within this rim 34 the elastic modulus may be constant or may be radially varied in order to control radial stresses and prevent the rim 30 from circumferentially fracturing into a plurality of concentric shells during operation of the flywheel. This type of circumferential fracture of flywheel rims into concentric shells has been observed with conventional homogenous flywheel rims. Similarly to the attachment of the hub 22 to shaft 12, the hub 22 and rim 34 may be united by an adhesive joint, indicated with the arrowed numeral 40, which is disposed between surface 32 and the inner surface 42 of the rim 34.

As is indicated by dashed lines viewing FIG. 2, the rim 34 expands radially in response to the great centrifugal force acting on this rim at high rotational speeds. Similarly, the hub 22 expands radially in response to these centrifugal forces, with the greatest expansion being experienced at the outer portions of the rim, with less expansion near to the bore 26. Preferably, the hubs 22' and 22" are configured and fabricated so that the deformation at the bore 26 substantially matches that of the outer surface of shaft 12. As a result, the adhesive joint 26' is subjected to only low stresses from this expansion. The hubs 22' and 22" are also configured and fabricated so that the expansion of the portion 30 at surface 32 substantially matches the radial expansion of the inner surface 42 of the rim 34. Again, the adhesive joint 40 will be subjected to only low stresses because of this expansion.

As is seen viewing FIG. 2, the hub 22 (each part 22' and 22') is configured as a shallow conical section having a dihedral angle indicated at 44. As a result of the greater radial and circumferential expansion near the portion 30, the hub 22 flattens as it approaches its selected operational speed. At the upper end of the range of selected operational speeds for the operation of flywheel 10, the hub 22 (parts 22' and 22") is completely flattened in the portion 28 which then extends truly radially between the shaft 12 and rim 34 (indicated on FIG. 2 with the numeral 28 having a dashed lead line). It will be noted viewing FIG. 2 that the portion 28 has a radially inner peripheral part 28a adjacent to and joining with the portion 24, and a radially outer peripheral part 28b adjacent to and joining with the portion 30. When the flywheel 10 is at rest or at a speed below the selected design operating speed for the flywheel, the parts 28a and 28b are axially offset relative to one another. However, as FIG. 2 shows in the dashed line position for the portion 28, when the selected design operating speed for the flywheel 10 is achieved, the parts 28a and 28b are in radial congruence with one another (part 28b has its dashed line position seen in this Figure). That is, if a radial line were extended from the shaft 12 (i.e., perpendicular to the axis of this shaft) through one of these parts 28a and 28b, it will pass also through the other. Thus, it is seen that the dashed line position for the portion 28, as seen in FIG. 2, illustrates the radial direction. It is an important feature of the dihedral geometry of the hub 22 that results in a specific flattening of this hub, and a matching of the radial expansion at the outer diameter of the hub to the inner diameter of the rim 34. This expansion is much greater than for conventional hubs. The enhanced radial expansion of the hub 22 allows the hub outer diameter expansion to be matched to the rim inner diameter, and the expansion of this inner diameter at operating speeds for the flywheel 10. Thus, there is a minimizing of the stress at the hub-to-rim interface (i.e., at joint 40), and the stress in the hub is not affected by a centrifugal loading from the rim 34.

As a result of this flattening of the hub 22 at the selected operational speed for the flywheel 10, the rim 34 is moved axially relatively to its "at-rest" position, as is seen in FIG. 2. That is, the rim 24 expands radially and is moved axially relatively to its at-rest condition and position to the dashed line condition and axial position seen in FIG. 2 as the flywheel achieves its selected operational speed. As a result, the rim 34 and hub 22 are essentially independent of one another so far as radial and hoop stresses are concerned. That is, the rim 34 does not impose any significant stress on the hub 22 between at-rest and selected operational speed, and vice versa. The hoop and radial stresses between the hub and rim are also independent of one another. Both hoop stress and radial stress are distributed much more evenly throughout the hubs 22' and 22" (and also at the bonds 26' and 40) than would otherwise be the case.

Consequently, the rim 34 and hub 22 may each be designed for optimum stress distribution therein. The ultimate operational speed for the flywheel 10 is determined by the stressed within the rim 34, and by bending stresses in the interfaces between portion 28 and the inner and outer peripheral edge portions 24 and 30. The rim-to-hub interface (i.e., at joint 40) is the less highly stressed of these junctions so that the strength of the adhesive bond joint 40 provided at this location does not determine the ultimate operational speed for the flywheel 10.

Although the slope or dihedral 44 of the hub 22 is selected for the optimal redistribution of stress within the flywheel and can vary based on the material properties of the hub, typically the slope or dihedral angle 44 ranges from about 2% to about 20%. A slope of eight percent translates to a shallow angle 44 of approximately 5° from the true radial. Viewing FIG. 2, it will be seen that the angle 44 is greatly exaggerated for purposes of illustration. Accordingly, considered across a diameter, on opposite sides of the rotational axis of shaft 12, the hub portions 28 are each offset by approximately 5° with respect to the true radial direction. As a result, the hub portions 22' and 22" of exemplary embodiments of the present invention define an included angle (indicated with the numeral 44' on FIG. 2) of approximately 170°.

In general, the flywheels of the present invention include conical hubs which deviate from a planar configuration by a relatively small, but critical, amount. As indicated above, the amount of deviation from flatness is calculated to distribute the spinning stresses in such a way that the maximum safe rotational speed may be increased compared to conventional flywheels. That is, the deviation or axial offset is calculated to simultaneously lower radial stresses and hoop stresses experienced by the flywheel rotor at operational rotation rates. Of course, such calculations and the ultimate shape of the rotor are dependent on the materials chosen to fabricate the rotor. However, as will be discussed in detail below, calculations typically indicate that the amount of deviation from the radial plane necessary for optimum stress distribution and energy storage efficiency results in a flywheel rotor which may be approximated by a truncated cone. This configuration may be easily fabricated using conventional production techniques. Additionally, these generally cone-shaped hubs for a flywheel will nest when several of the hubs are like disposed and spaced from one another along a shaft as is seen in FIG. 2.

The particular details of construction for one exemplary embodiment of the present invention may be appreciated more readily seen in the table immediately below.

TABLE

| Component | Construction | Dimensions | MAX Speed |
|---|---|---|---|
| HUB | IM7 fiber [0/90] lay up | .030 thick 10.2° angle 1.3" i.d. 5.5" o.d. | 101,000 RPM |
| RIM | 95% fiber wound in epoxy matrix IM7 fiber | 1.2" thick | 113,000 RPM |

The hub-to-rim and hub-to-shaft stresses for this flywheel were 1660 psi (tension) and 666 psi (tension), respectively. Thus, it is clear that adhesive bonded joints at 26' and 40 are feasible for the construction of a flywheel embodying the present invention.

Those skilled in the art will further appreciate that the present invention may be embodied in other specific forms without departing from the spirit or central attributes thereof. In that the foregoing description of the present invention discloses only one exemplary embodiment thereof, it is to be understood that other variations are recognized as being within the scope of the present invention. Accordingly, the present invention is not limited to the particular embodiments which have been described in detail herein. Rather, reference should be made to the appended claims to define the scope and content of the present invention.

What is claimed is:

1. A method for the storage of kinetic energy using a flywheel, said method comprising:

providing a rotatable shaft defining a central axis of rotation;

providing a circumferentially and radially continuous disk-shaped conical hub portion concentrically arranged about said rotatable shaft and drivingly coupling thereto;

configuring said flywheel hub portion to have a radially inner peripheral portion adjacent to said rotatable shaft and a radially outer peripheral portion offset axially with respect to said radially inner peripheral portion;

carrying a cylindrical flywheel rim upon said radially outer peripheral portion of said flywheel hub;

spinning said flywheel about the central axis of rotation;

deflecting said radially outer peripheral portion toward radial congruence with said radially inner peripheral portion; and utilizing said axial deflection of said hub portion to move said rim portion also axially in response to spinning of said flywheel about said axis of rotation.

2. A method of operating a flywheel, said method comprising steps of:

providing said flywheel with a central shaft defining an axis of rotation for said flywheel;

providing said flywheel with a hub inwardly joining drivingly with said shaft and extending radially outwardly there around;

providing said flywheel with a rim portion carried upon and being comparatively more massive than said hub portion; and employing said hub portion to move said rim portion axially between a first position which is occupied by said rim portion while said flywheel is at-rest, and a second position axially displaced from said first position in response to centrifugal force at a selected operational speed for said flywheel.

3. The method of claim 2 further including the step of using said hub portion to progressively move said rim portion axially between said first and said second positions with increasing rotational speed of said flywheel between a condition of said flywheel being at-rest and said selected operational speed.

4. The method of claim 2 further including the step of providing said hub portion with a central disk-shaped portion extending radially between said shaft and said rim portion, and configuring said central portion of said hub to define a selected shallow angle with respect to a radial direction.

5. The method of claim 4 further including the step of selecting said shallow angle with respect to said radial direction to be in the range from about 2% to about 20% slope.

* * * * *